United States Patent
Fukui

(10) Patent No.: US 8,237,373 B2
(45) Date of Patent: Aug. 7, 2012

(54) DRIVE DEVICE FOR PERFORMING ELECTRIC POWER CONVERSION BY USING SWITCHING ELEMENT

(75) Inventor: Hiroyuki Fukui, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 437 days.

(21) Appl. No.: 12/539,030

(22) Filed: Aug. 11, 2009

(65) Prior Publication Data
US 2010/0039047 A1    Feb. 18, 2010

(30) Foreign Application Priority Data
Aug. 12, 2008   (JP) .................. 2008-208063

(51) Int. Cl.
*H05B 41/36* (2006.01)
(52) U.S. Cl. .......... 315/291; 315/224; 363/21.12
(58) Field of Classification Search .......... 315/291, 315/297, 224, 247, 186; 363/21.12, 21.16, 363/21.17, 21.18
See application file for complete search history.

(56) References Cited

U.S. PATENT DOCUMENTS
7,119,499 B2 * 10/2006 Ishigaki et al. .............. 315/291
7,830,094 B2 * 11/2010 He et al. .................. 315/224

FOREIGN PATENT DOCUMENTS
JP    2004-192833    7/2004
JP    2004-207654    7/2004
* cited by examiner

*Primary Examiner* — Daniel D Chang
(74) *Attorney, Agent, or Firm* — Fish & Richardson P.C.

(57) ABSTRACT

A drive device includes a primary-side rectifier circuit for rectifying a received alternating-current voltage, a first capacitor for smoothing the rectified voltage, a switching element coupled to a primary winding of a transformer, for converting the smoothed voltage into an alternating-current voltage by turning on and off to be supplied to the primary winding, a secondary-side rectifying-smoothing circuit for rectifying and smoothing an alternating-current voltage induced at a secondary winding of the transformer to be outputted to a load, a switching control circuit for turning on and off the switching element by supplying a drive voltage to a control electrode of the switching element, and a bias circuit for supplying a bias voltage to the control electrode of the switching element, based on a voltage induced at the primary winding.

4 Claims, 5 Drawing Sheets

DRIVE DEVICE FOR PERFORMING ELECTRIC POWER CONVERSION BY USING SWITCHING ELEMENT

BACKGROUND OF THE INVENTION

1. Field of the Invention

The present invention relates to a drive device, and particularly relates to a drive device for performing electric power conversion by using a switching element.

2. Description of the Background Art

There have been developed lighting devices such as a fluorescent lamp and a street lamp, which use a light-emitting element such as an LED (Light-Emitting Diode). The range of uses of an LED lighting device that uses such an LED has been increased from supplemental lighting to main lighting for household purposes. Generally, the lifetime of a fluorescent lamp is 2 to 3 years, while the lifetime of an LED is approximately 40,000 hours, which is much longer than that of the fluorescent lamp. The LED lighting device is configured with, for example, a plurality of LEDs and a plurality of drive devices for driving these LEDs, respectively.

As an example of the LED lighting device, Japanese Patent Laying-Open No. 2004-207654, for example, discloses a configuration as described below. Specifically, the lighting device includes a rectifier circuit made of a diode bridge, for full-wave rectifying a commercial alternating-current power source (AC 100V), a smoothing circuit made of an electrolytic capacitor, for smoothing a rectified direct current, two LED rows using the smoothed direct current as a common power source and connected in parallel with the relevant common power source, a constant-current circuit connected in series with one of the LED rows, and another constant-current circuit connected in series with the other of the LED rows.

Further, as an example of the LED lighting device, Japanese Patent Laying-Open No. 2004-192833 discloses a configuration as described below. Specifically, this configuration includes two bridge diodes, and an LED unit circuit connected between these bridge diodes. The LED unit circuit includes a smoothing capacitor, which is an electrolytic capacitor.

Replacement of a fluorescent lamp is easy, whereas replacement of an LED lighting device may be difficult because an embedded-type one such as a downlight exists. Accordingly, the LED lighting device is required to have long lifetime.

Here, the LED has long lifetime as described above, and hence in order to prolong the lifetime of the LED lighting device, it is important to prolong the lifetime of the drive device. In the configurations described in Japanese Patent Laying-Open No. 2004-207654 and Japanese Patent Laying-Open No. 2004-192833, a large-capacitance electrolytic capacitor is provided so as to smooth an input alternating-current voltage, after full-wave rectification. However, the lifetime of the electrolytic capacitor is generally short, and is only 5,000 hours under the condition of, for example, 105° C. In addition, such a large-capacitance electrolytic capacitor is large in size, and thus it is difficult to reduce the size of the LED lighting device.

SUMMARY OF THE INVENTION

An object of the present invention is to provide a drive device capable of supplying electric power to a load such as an LED, and achieving long lifetime and size reduction.

A drive device according to a certain aspect of the present invention is a drive device for supplying electric power to a load, including: a primary-side rectifier circuit for rectifying a received alternating-current voltage; a first capacitor for smoothing the rectified voltage; a transformer including a primary winding and a secondary winding; a switching element coupled to the primary winding, for converting the smoothed voltage into an alternating-current voltage by turning on and off to be supplied to the primary winding; a secondary-side rectifying-smoothing circuit for rectifying and smoothing an alternating-current voltage induced at the secondary winding to be outputted to the load; a switching control circuit for turning on and off the switching element by supplying a drive voltage to a control electrode of the switching element; and a bias circuit for supplying a bias voltage to the control electrode of the switching element, based on a voltage induced at the primary winding.

Preferably, the bias circuit includes a second capacitor connected between a first end of the primary winding and the control electrode of the switching element, and a diode connected between a second end of the primary winding and a connection node of the control electrode of the switching element and the second capacitor.

More preferably, the bias circuit further includes a first resistor connected between the control electrode of the switching element and a connection node of the second capacitor and the diode, and a second resistor connected to a connection node of the control electrode of the switching element and the first resistor.

Preferably, the first capacitor is a ceramic capacitor.

Preferably, the load is a light-emitting element.

According to the present invention, it is possible to supply electric power to a load such as an LED, and achieve long lifetime and size reduction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
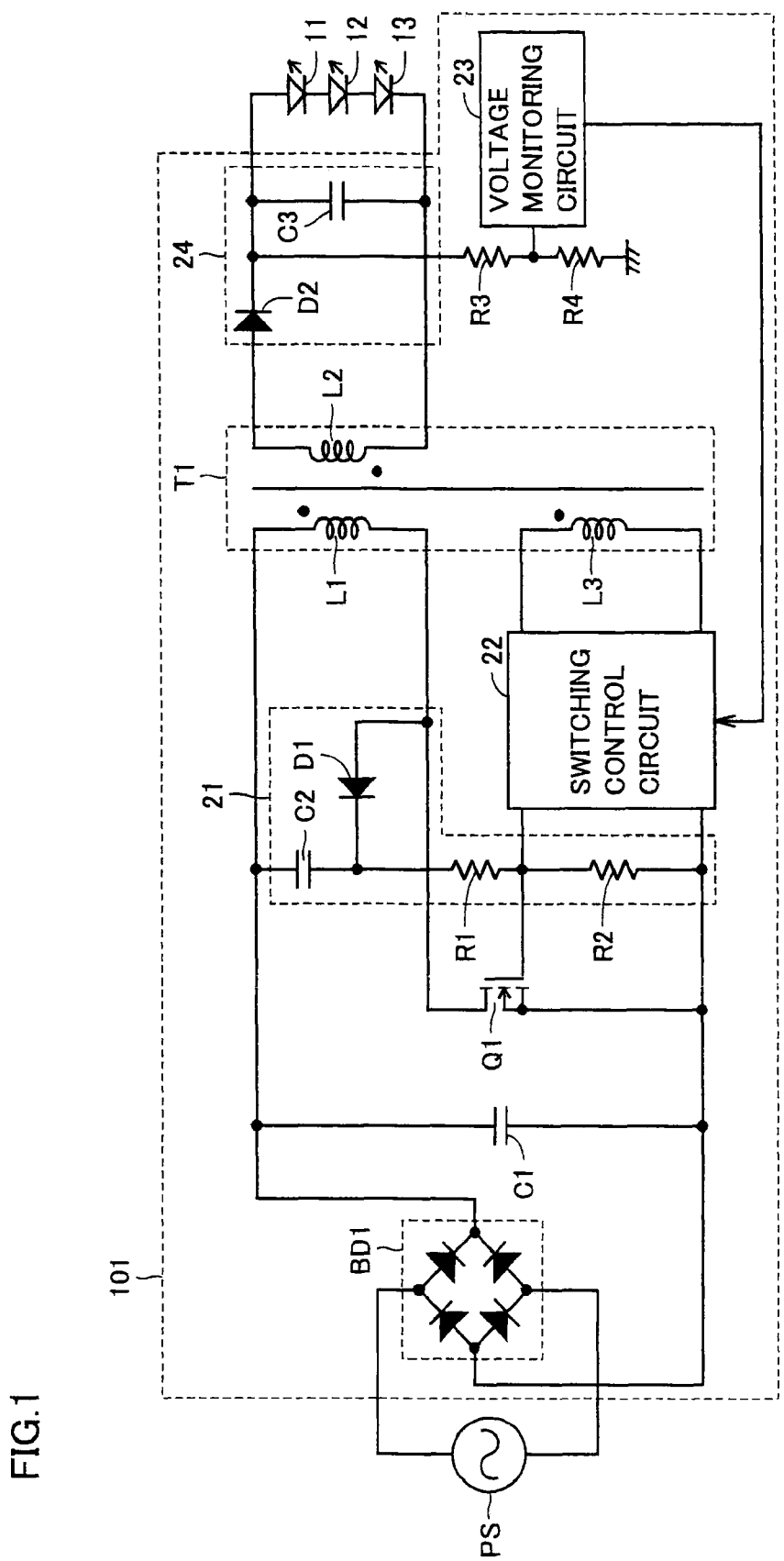
FIG. 1 is a diagram that shows a configuration of a drive device according to an embodiment of the present invention.

An embodiment of the present invention will hereinafter be described with reference to the drawings. It is noted that the same or corresponding portions in the drawings are provided with the same reference characters, and the description thereof will not be repeated.

FIG. 1 is a diagram that shows a configuration of a drive device according to the embodiment of the present invention.

With reference to FIG. 1, a drive device 101 includes a bridge diode (primary-side rectifier circuit) BD1, a capacitor C1, an N-channel MOS transistor (switching element) Q1, a transformer T1, resistors R3, R4, a bias circuit 21, a switching control circuit 22, a voltage monitoring circuit 23, and a secondary-side rectifying-smoothing circuit 24. Transformer T1 includes a primary winding L1, a secondary winding L2, and an auxiliary winding L3. Bias circuit 21 includes a diode D1, a capacitor C2, and resistors R1, R2. Secondary-side rectifying-smoothing circuit 24 includes a diode D2 and a capacitor C3. Capacitor C1 is identified as a capacitor having longer lifetime and smaller capacitance when compared with an electrolytic capacitor, and is, for example, a ceramic capacitor.

A first end and a third end of bridge diode BD1 are connected to an alternating-current power source PS. A second end of bridge diode BD1, a first end of capacitor C1, a first end of capacitor C2, and a first end of primary winding L1 are connected. A second end of capacitor C2, a cathode of diode D1, and a first end of resistor R1 are connected. A second end of primary winding L1, an anode of diode D1, and a drain of N-channel MOS transistor Q1 are connected. A second end of resistor R1, a gate of N-channel MOS transistor Q1, a first end of resistor R2, and switching control circuit 22 are connected. A fourth end of bridge diode BD1, a second end of capacitor C1, a source of N-channel MOS transistor Q1, a second end of resistor R2, and switching control circuit 22 are connected.

A first end of secondary winding L2 and an anode of diode D2 are connected. A cathode of diode D2, a first end of capacitor C3, a first end of resistor R3, and an anode of LED 11 are connected. A second end of secondary winding L2, a second end of capacitor C3, and a cathode of LED 13 are connected. A second end of resistor R3 and a first end of resistor R4 are connected. A second end of resistor R4 is connected to a node to which a ground voltage is supplied. LEDs 11, 12, 13 are connected in series in this order.

An alternating-current voltage outputted from alternating-current power source PS is full-wave rectified by bridge diode BD1. The voltage full-wave rectified by bridge diode BD1 is smoothed by capacitor C1.

Switching control circuit 22 operates by an alternating-current voltage induced at auxiliary winding L3 in transformer T1. Switching control circuit 22 supplies a drive voltage for turning on and off N-channel MOS transistor Q1 to the gate of N-channel MOS transistor Q1.

N-channel MOS transistor Q1 performs a switching operation for turning on and off based on the drive voltage from switching control circuit 22. By the switching operation, N-channel MOS transistor Q1 converts the voltage between both ends of capacitor C1, namely, the voltage rectified and smoothed by bridge diode BD1 and capacitor C1, into an alternating-current voltage, and supplies the converted voltage to primary winding L1 in transformer T1.

Diode D2 rectifies an alternating-current voltage induced at secondary winding L2 in transformer T1. Capacitor C3 smoothes the voltage rectified by diode D2. The voltage rectified and smoothed by diode D2 and capacitor C3 is supplied to LEDs 11-13.

Voltage monitoring circuit 23 monitors the voltage supplied to LEDs 11-13, and transmits the monitoring result to switching control circuit 22. More specifically, voltage monitoring circuit 23 monitors a voltage at a connection node of resistor R3 and resistor R4, and outputs a control signal indicative of the monitoring result to switching control circuit 22 via a photocoupler or the like not shown. Based on the control signal received from voltage monitoring circuit 23, switching control circuit 22 changes a switching frequency, a duty of the drive voltage, and others for N-channel MOS transistor Q1.

Here, description will be made on the problems caused in the case with the assumption that the drive device according to the embodiment of the present invention does not include bias circuit 21.

Figure 2:
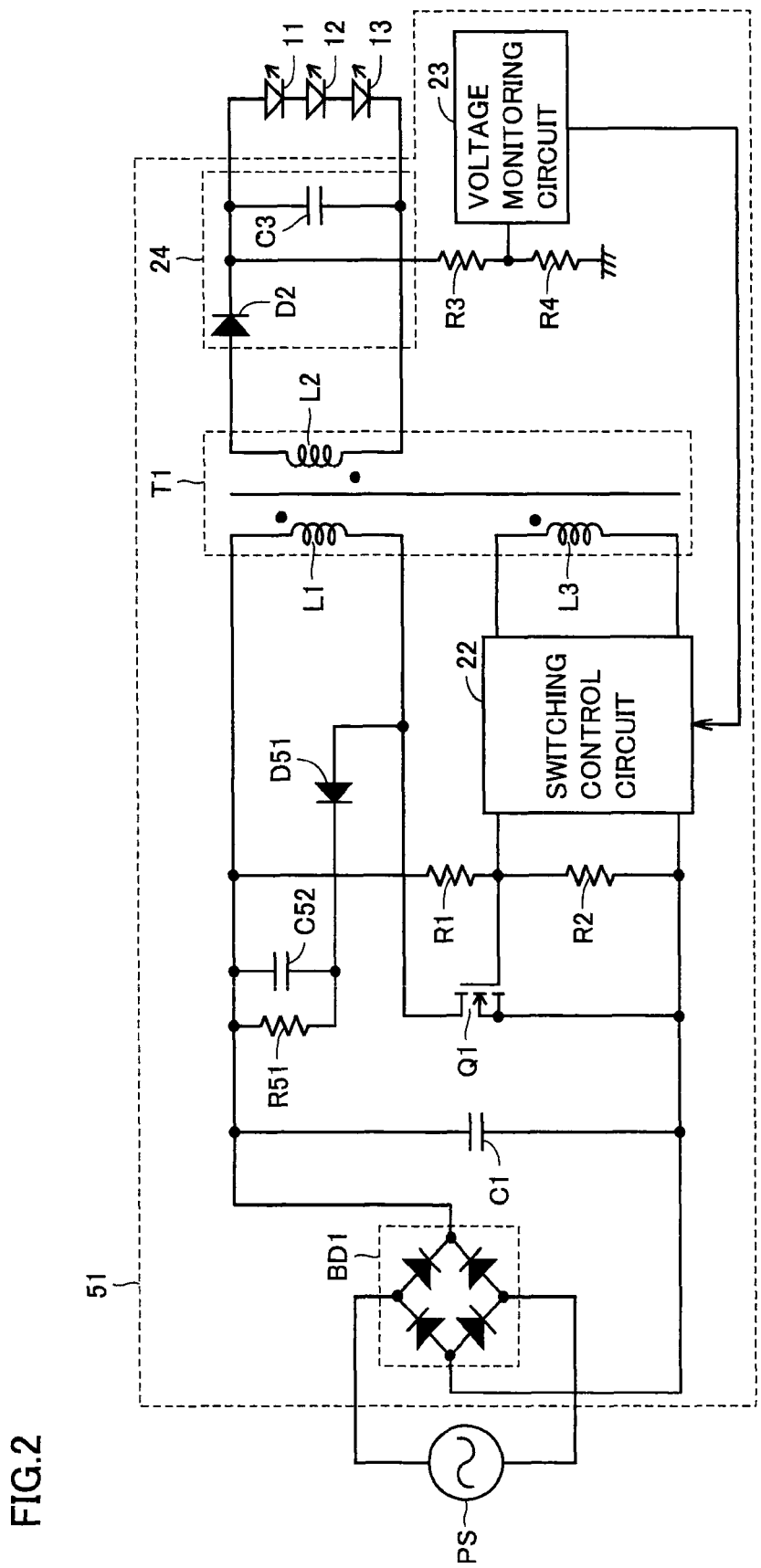
FIG. 2 is a diagram that shows a configuration in the case with the assumption that the drive device according to the embodiment of the present invention does not include a bias circuit.

FIG. 2 is a diagram that shows a configuration in the case with the assumption that the drive device according to the embodiment of the present invention does not include the bias circuit.

With reference to FIG. 2, a drive device 51 includes bridge diode BD1, capacitor C1, N-channel MOS transistor Q1, transformer T1, resistors R3, R4, a diode D51, a capacitor C52, a resistor R51, switching control circuit 22, voltage monitoring circuit 23, and secondary-side rectifying-smoothing circuit 24.

Figure 3A:
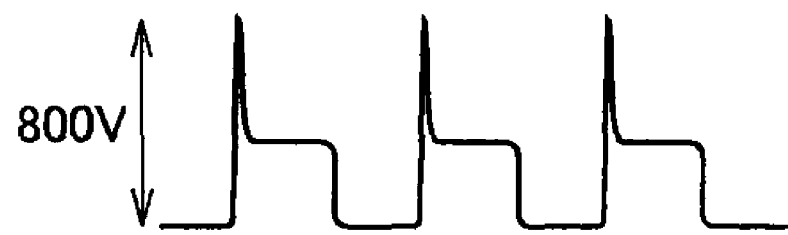
FIGS. 3A and 3B are waveform diagrams each showing a flyback voltage generated at a primary winding in the drive device.
Figure 3B:
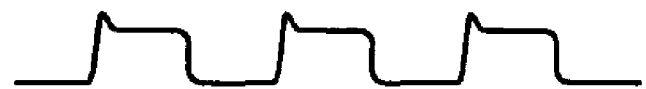

FIGS. 3A and 3B are waveform diagrams each showing a flyback voltage generated at the primary winding in the drive device.

With reference to FIG. 3A, when N-channel MOS transistor Q1 is turned off, an induced electromotive force is generated at primary winding L1, and the induced electromotive force causes a flyback voltage, a level of which sharply rises up to a few hundred volts. For example, if the winding ratio between the primary winding L1 and secondary winding L2 is 10:1, and the level of a voltage induced at secondary winding L2 is 80 V, for example, a flyback voltage having a level of 800 V is generated.

In drive device 51, however, the circuit configured with resistor R51, capacitor C52, and diode D51 allows an induced current generated at primary winding L1 to flow through diode D51 and resistor R51, resulting in that the level of the flyback voltage is lowered by resistor R51. Therefore, a waveform of the voltage to be applied to N-channel MOS transistor Q1 is as shown in FIG. 3B.

Figure 4:
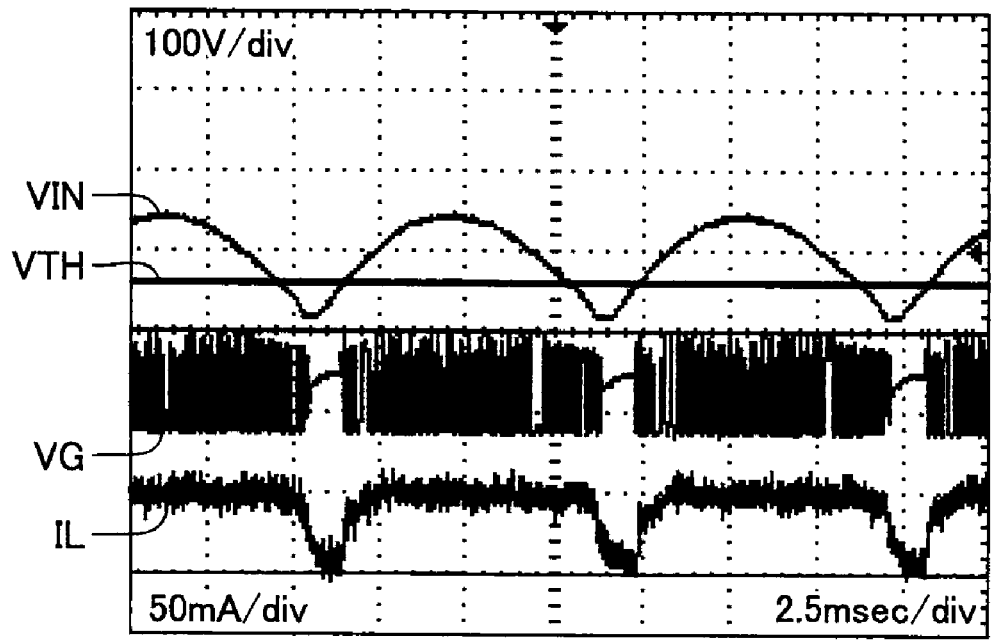
FIG. 4 is a waveform diagram that shows an operation of a drive device 51.

FIG. 4 is a waveform diagram that shows an operation of drive device 51. In FIG. 4, VIN represents a voltage rectified and smoothed by bridge diode BD1 and capacitor C1, VTH represents a minimum level of voltage VIN necessary for N-channel MOS transistor Q1 to be turned on, VG represents a gate voltage of N-channel MOS transistor Q1, and IL represents a current flowing through LEDs 11-13.

With reference to FIG. 4, capacitor C1 is a small-capacitance ceramic capacitor, and hence the degree of smoothing the voltage, which has been full-wave rectified by bridge diode BD1, is lower than the degree in the electrolytic capacitor. Accordingly, the level of voltage VIN is below VTH, resulting in a period during which the switching of N-channel MOS transistor Q1 is halted. In this period during which the switching is halted, current IL is significantly lowered, so that LEDs 11-13 inevitably flicker.

Figure 5:
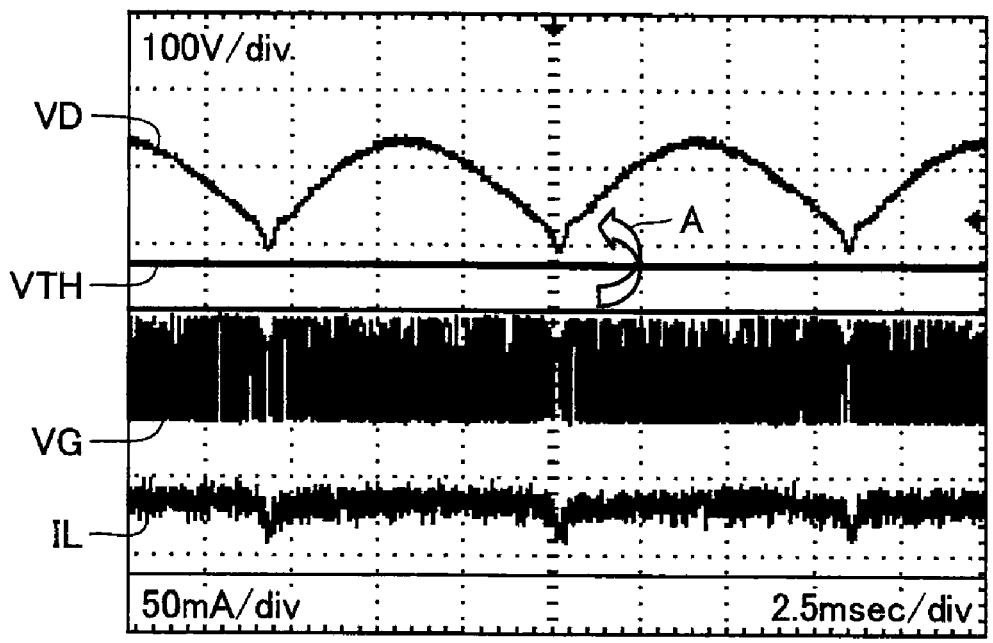
FIG. 5 is a waveform diagram that shows an operation of a drive device 101.

FIG. 5 is a waveform diagram that shows an operation of drive device 101. In FIG. 5, VD represents a drain voltage of N-channel MOS transistor Q1, VTH represents a minimum level of voltage VD necessary for N-channel MOS transistor Q1 to be turned on, VG represents a gate voltage of N-channel MOS transistor Q1, and IL represents a current flowing through LEDs 11-13.

With reference to FIG. 5, in drive device 101, when N-channel MOS transistor Q1 is turned off, the induced electromotive force is generated at primary winding L1, and the induced electromotive force causes a flyback voltage as in drive device 51.

Here in drive device 101, capacitor C1 is a small-capacitance ceramic capacitor as in drive device 51, and hence the degree of smoothing the voltage, which has been full-wave rectified by bridge diode BD1, is lower than the degree in the electrolytic capacitor.

In drive device 101, however, bias circuit 21 supplies a bias voltage to the gate of N-channel MOS transistor Q1, based on the flyback voltage generated at the primary winding.

In other words, in drive device 51, the gate of N-channel MOS transistor Q1 is supplied with the voltage smoothed by capacitor C1, whereas in drive device 101, the gate of N-channel MOS transistor Q1 is supplied with the flyback voltage generated at primary winding L1, in addition to the rectified and smoothed voltage. As shown in an arrow A in FIG. 5, the DC level of gate voltage VG of N-channel MOS transistor Q1 is thereby increased in comparison with the DC level in drive device 51, so that it is possible to prevent gate voltage VG from being below voltage level VTH. It is thereby possible to prevent a halt of the switching of N-channel MOS transistor Q1, and thus prevent significant decrease in current IL and flickering of LEDs 11-13.

Furthermore, in drive device 101, the induced current generated at primary winding L1 flows through resistors R1, R2, and the flyback voltage is lowered by resistors R1, R2, so that the waveform of the voltage to be applied to N-channel MOS transistor Q1 is similar to the waveform in drive device 51, as shown in FIG. 3B. Accordingly, there is no need to use a high-voltage transistor as N-channel MOS transistor Q1.

Further in drive device 101, resistors R2, R3 for setting the DC level of the gate voltage of N-channel MOS transistor Q1 are used as a substitute for resistor R51 in drive device 51. As a result, in comparison with drive device 51, drive device 101 no longer needs resistor R51, so that size reduction can be achieved.

Figure 6:
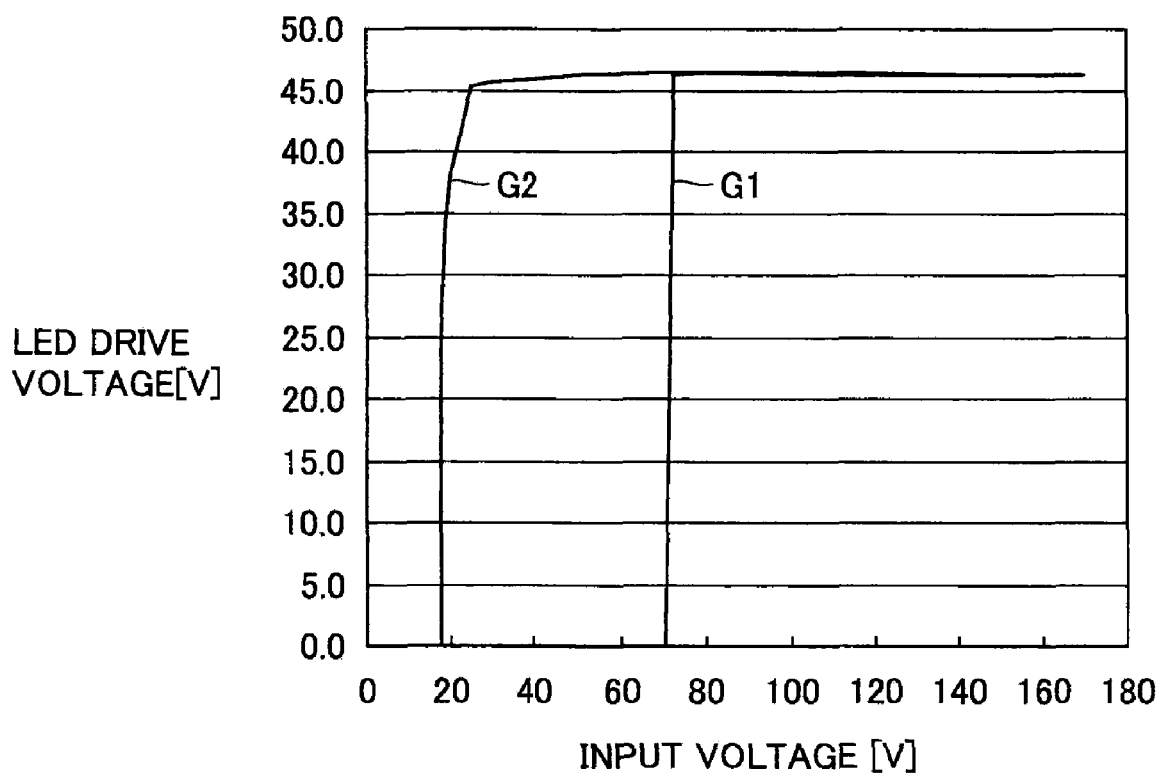
FIG. 6 is a graph that shows the relation between an LED drive voltage and an input voltage in each of drive device 51 and drive device 101.

FIG. 6 is a graph that shows the relation between the LED drive voltage and an input voltage in each of drive device 51 and drive device 101. In FIG. 6, graph G1 shows an LED drive voltage in drive device 51, while graph G2 shows an LED drive voltage in drive device 101.

With reference to FIG. 6, in drive device 51, when the input voltage, namely, the voltage rectified and smoothed by bridge diode BD1 and capacitor C1 becomes 70 V or lower, the LED drive voltage to be applied to LEDs 11-13 becomes 0 V. In contrast, in drive device 101, the LED drive voltage does not fall to 0 V until the input voltage becomes 20 V or lower.

As such, in the drive device according to the embodiment of the present invention, a ceramic capacitor is used as the smoothing capacitor. However, the level of gate voltage VG is increased by bias circuit 21, so that even if the input voltage level, namely, the amplitude of the input alternating-current voltage is small, electric power can stably be supplied to the LEDs.

In other words, the drive device according to the embodiment of the present invention can achieve long lifetime and size reduction, and stably supply electric power to the load.

By prolonging the lifetime of the drive device, it becomes much easier for the drive device according to the embodiment of the present invention to be introduced into the housing market where the LED lighting device is required to have longer lifetime.

Furthermore, by using an LED bulb provided with drive device 101 and LEDs as a substitute for an incandescent bulb and a halogen bulb, it becomes possible to move into the bulb market.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A drive device for supplying electric power to a load, comprising:
    a primary-side rectifier circuit for rectifying a received alternating-current voltage;
    a first capacitor for smoothing, said rectified voltage;
    a transformer including a primary winding and a secondary winding;
    a switching element coupled to said primary winding, for converting said smoothed voltage into an alternating-current voltage by turning on and off to be supplied to said primary winding;
    a secondary-side rectifying-smoothing circuit for rectifying and smoothing an alternating-current voltage induced at said secondary winding to be outputted to said load;
    a switching control circuit for turning on and off said switching element by supplying a drive voltage to a control electrode of said switching element; and
    a bias circuit for supplying a bias voltage to the control electrode of said switching element, based on a voltage induced at said primary winding, wherein said bias circuit includes:
        a second capacitor connected between a first end of said primary winding and the control electrode of said switching element, and
        a diode connected, a second end of said primary winding and a connection node of the control electrode of said switching element and said second capacitor.

2. The drive device according to claim 1, wherein said bias circuit further includes
    a first resistor connected between the control electrode of said switching element and a connection node of said second capacitor and said diode, and
    a second resistor connected to a connection node of the control electrode of said switching element and said first resistor.

3. The drive device according to claim 1, wherein said first capacitor is a ceramic capacitor.

4. The drive device according to claim 1, wherein said load is a light-emitting element.

* * * * *